US006831918B1

(12) United States Patent
Kavak (10) Patent No.: US 6,831,918 B1
(45) Date of Patent: Dec. 14, 2004

(54) IP/ATM NETWORK SYSTEM ADAPTED FOR THE SIMULTANEOUS TRANSMISSION OF IP DATA PACKETS TO A PLURALITY OF USERS

(75) Inventor: Nail Kavak, Varby (SE)

(73) Assignee: Telia AB, Farsta (SE)

( * ) Notice: Subject to any disclaimer, the term of this patent is extended or adjusted under 35 U.S.C. 154(b) by 0 days.

(21) Appl. No.: 09/554,613

(22) PCT Filed: Nov. 27, 1998

(86) PCT No.: PCT/SE98/02156
§ 371 (c)(1),
(2), (4) Date: Sep. 1, 2000

(87) PCT Pub. No.: WO99/29137
PCT Pub. Date: Jun. 10, 1999

(30) Foreign Application Priority Data

Dec. 1, 1997 (SE) .............................. 9704457

(51) Int. Cl.[7] .............................................. H04L 12/28
(52) U.S. Cl. .............................. 370/395.52; 370/395.54
(58) Field of Search ........................ 370/395.1, 395.51, 370/395.52–395.54, 401

(56) References Cited

U.S. PATENT DOCUMENTS

| 5,331,637 | A | * | 7/1994 | Francis et al. | ............... | 370/408 |
| 5,831,975 | A | * | 11/1998 | Chen et al. | ............... | 370/256 |
| 6,138,144 | A | * | 10/2000 | DeSimone et al. | ......... | 709/204 |
| 6,181,697 | B1 | * | 1/2001 | Nurenberg et al. | ......... | 370/390 |
| 6,353,596 | B1 | * | 3/2002 | Grossglauser et al. | ...... | 370/256 |

OTHER PUBLICATIONS

G. Armitage, 'IP Multicasting over ATM Networks', IEEE Journal On Selected Areas In Communications, vol. 15, No. 3, Apr. 1997, pp. 445–457.*
R. Talpade and M. Ammar, RFC 2149, 'Multicast Server Architectures for MARS–based ATM Multicasting', IETF, May, 1997.*
Computer Communication Review, vol. 23, No. 4, Oct. 1993, Ballardie, T., "Core Based Trees (CBT) An Architecturefor Scalable Inter–Domain Multicast Routing" pp. 85–95.*

* cited by examiner

Primary Examiner—Chau Nguyen
Assistant Examiner—Daniel K. Lam
(74) Attorney, Agent, or Firm—Oblon, Spivak, McClelland, Maier & Neustadt, P.C.

(57) ABSTRACT

An ATM transmission system is adapted for the simultaneous transmission (i.e. multicasting) of IP data packets to a plurality of system users, using ATM as a carrier network, and includes an IP/ATM network including clusters of Logical IP Systems (LISs), a multicast address resolution server (MARS) for each cluster, and a multicast router (MCR) for each cluster. The clusters are interconnected through the MCRs which form an inter-cluster backbone for the IP/ATM network. Each cluster includes an integral number of ATM hosts and LISs, the size of a cluster is dependent on physical and administrative constraints, and each LIS, within a cluster, is adapted to support a number of ATM hosts. Multicasting of IP data packets within a cluster utilizes a MARS protocol, and multicasting between clusters utilizes an inter-cluster multicasting protocol (ILMP). All ATM hosts within a cluster, even if supported by different LISs, are adapted to be configured with an address of the same MARS.

44 Claims, 3 Drawing Sheets

IP/ATM NETWORK SYSTEM ADAPTED FOR THE SIMULTANEOUS TRANSMISSION OF IP DATA PACKETS TO A PLURALITY OF USERS

BACKGROUND OF THE INVENTION

1. Field of the Invention

The present invention relates to an ATM transmission system which utilizes an inter-cluster multicast protocol (ILMP), a method for the simultaneous transmission (i.e. multicasting) of IP data packets using ATM as a carrier network, and a telecommunication system including the ATM transmission system of the present invention.

2. Discussion of the Background

In multicasting, one message is simultaneously transmitted to a number of receivers, i.e. transmitted at the same time to a number of users of a multicasting service. With a multicasting service, use of the network's resources may be optimized by copying the multicast messages in the net rather than at the user terminals. Many of the existing services, offered by network operators, could have been implemented, in a more effective manner, if support for multicasting had been available for use with such services. In future, many multimedia applications will be dependent on a multicasting service. Some examples of multimedia applications, which could be more effectively implemented with the aide of a multicasting service, are as follows:

exchange of information in real time;

video conferences;

distance working, for example, working at a location remote from a central office, company premises, administration center, etc.; and video games.

IP (Internet Protocol) networks, in which ATM (Asynchronous Transfer Mode) is used as a carrier network, do not have support for multicasting. Known existing solutions, for example, MARS (Multicast Address Resolution Service), work for a limited number of users, i.e. about 255 users.

The Internet Engineering Task Force (IETF) have published a Request for Comment (RFC), namely, RFC 2022, which specifies a method that provides multicast support for IP end-systems, or routers, over an ATM network. However, the RFC 2022 (MARS) solution is restricted to intra-LIS communication.

In Telia's IP/ATM network, known as Broadway, multicasting can be provided using the MARS protocol. However, such a solution does not scale since any multicasting protocol has to deal with both intra-LIS and inter-LIS multicasting.

There is, therefore, at the present time, a distinct lack of established methods for inter-LIS multicasting for use in IP/ATM telecommunication systems.

SUMMARY OF THE INVENTION

It is an object of the present invention to provide an ATM transmission system in which multicasting between clusters utilizes inter-cluster multicasting protocols, and in which multicasting within a cluster utilizes MARS. A cluster is a collection of hosts and routers belonging to the same domain. The use of an inter-cluster multicasting protocol (ILMP) makes it possible to provide a multicast service to a much larger number of users, i.e. up to 65,000 users, than is possible using present day solutions, for example, MARS which is, in essence, limited to one LIS and about 255 users.

It is another object of the present invention to provide a method for the simultaneous transmission (i.e. multicasting) of IP data packets, using ATM as a carrier network.

It is a further object of the present invention to provide a telecommunication system including the ATM transmission system of the present invention, or operating in accordance with the method of the present invention.

According to one aspect of the present invention, there is provided, an ATM transmission system, adapted for the simultaneous transmission (i.e. multicasting) of IP data packets to a plurality of system users, using ATM as a carrier network, characterised in that said transmission system includes an IP/ATM network including clusters of Logical IP Systems (LISs); a multicast address resolution server (MARS) for each cluster; and a multicast router (MCR) for each cluster, in that said clusters are interconnected through said MCRs which form an inter-cluster backbone for said IP/ATM network, in that multicasting of IP data packets within a cluster utilizes a MARS protocol, and in that multicasting between clusters utilizes an inter-cluster multicasting protocol (ILMP). The ATM transmission system may include means for gaining access to the Internet. Said means for gaining access to the Internet may include a non-ATM IP Subnet connected to said inter-cluster backbone. One of said MCRs may be adapted for use as an entry point for the IP/ATM network to the Internet.

Each cluster may consist of an integral number of ATM hosts and LISs, the size of a cluster being dependent on physical and administrative constraints, each LIS, within a cluster, may be adapted to support a number of ATM hosts, and all ATM hosts within a cluster, even if supported by different LISs, may be adapted to be configured with an address of the same MARS. For each cluster, the functionality of MARS and MCR may be adapted to be co-located.

In the presence of multiple MCRs belonging to the same cluster, said IP/ATM network may be adapted to select a MCR with the highest IP address as a default MCR.

MARS may be adapted to operate in server mode.

Said MCRs may be adapted to promiscuously receive all multicast traffic on a cluster.

Said MCRs may be adapted to support point-to-multipoint connections provided by UNI 3.0 signalling.

In accordance with the ATM transmission system of the present invention, all ATM hosts and MCRs, associated with the same cluster, may be adapted to be configured with the address of the same MARS, MARS may be adapted to operate in server mode, said IP/ATM network may be adapted to enable IP/ATM endpoints, within a cluster, to register as a member of an inter-cluster multicast group utilizing MARS procedures, said MCRs may be adapted to support point-to-multipoint connections provided by UNI 3.0 signalling, and a multicast server may be provided and adapted to manage said point-to-multipoint connections, and to distribute multicast traffic therefrom (i.e. as root) to all other leaves of said multipoint connections.

A MCR may be adapted, in advance of multicasting, to select a well known end-node and establish a connection thereto, said well known end-node being adapted to provide a database for the ATM addresses of inter-cluster multicast group members, and said well known end-node may be adapted to establish a point-to-multipoint tree and to distributing multicast traffic sent by a member of said inter-cluster multicast group to other members of said group using said tree. Each group address may have a corresponding well known end-node address.

Said IP/ATM network may be adapted to enable multicast packets to be sent to members of an inter-cluster multicast group, even if the sender is not a member of said group.

Said MCRs may be adapted to operate in either a server mode, or a Virtual Circuit (VC) mesh mode, the mode used being dependent on several criteria, such as, the number of inter-cluster multicast groups, the grouping mode (i.e. sparse, dense, etc.), traffic density, charging policies of a network operator, performance, reliability and system complexity.

When MCRs is adapted to operate in a server mode, said well-known end-node may be adapted to provide a database for IP multicast addresses, and corresponding ATM addresses for members of an inter-cluster multicast group, said MCRs may be adapted to issue multicast packets to said well known end-node for distribution to members of an inter-cluster multicast group, and said well known end-node may be adapted to establish a point-to-multipoint tree to said group members and to distributing multicast packets, received from said MCRs, to said group members using said tree.

When MCRs is adapted to operate in VC mesh mode, said well known end-nodes may be adapted to keep track of IP multicast addresses, and corresponding ATM members of said MCRs, and said IP/ATM network may be adapted to report changes in membership of an MCR to a respective well known end-node, and to establish point-to-multipoint trees between MCRs belonging to the same inter-cluster multicast group(s), when an association between said IP multicast addresses and said ATM members has been determined. Said IP/ATM network may include two control VCs between a MCR and said well-known end-node, in which case, a first one of said control VCs is a transient bidirectional point-to-point connection, between a MCR and said well-known end-node, and is adapted for use in registering group membership, and a second one of said control VCs is a unidirectional point-to-multipoint group_ctrl_VC , from said well-known end-node to the MCR, and is adapted to propagate group joining and leaving messages to the MCR.

Said IP/ATM network may be adapted to enable a multicast packet originating from a non-group member to be distributed to group members using a point-to-multipoint tree of a group member MCR, said well known end-node being adapted to establish a point-to-point connection between said non-group member and said group member MCR to facilitate the transfer of said multicast packet to said group member MCR and thereafter to said group members via said point-to-multipoint tree.

Said IP/ATM network may be adapted to enable a MCR to join, or leave, an inter-cluster multicast group, at the option of the MCR.

According to another aspect of the present invention, there is provided, in an ATM transmission system including an IP/ATM network, said network including clusters of Logical IP Systems (LISs), a multicast address resolution server (MARS) for each cluster and a multicast router (MCR) for each cluster, a method for the simultaneous transmission (i.e. multicasting) of IP data packets to a plurality of system users using ATM as a carrier network, said method being characterised by interconnecting said clusters through said MCRs to form an inter-cluster backbone for said IP/ATM network, by using a MARS protocol for multicasting said IP data packets within a cluster, and by using an inter-cluster multicasting protocol (ILMP) for multicasting said IP data packets between clusters. The method may be characterised by obtaining access to the Internet for said IP/ATM network. The method may be further characterised by said IP/ATM network, in the presence of multiple MCRs belonging to the same cluster, selecting a MCR with the highest IP address as a default MCR. MARS may operate in server mode. Said MCRs may promiscuously receiving all multicast traffic on a cluster and may support point-to-multipoint connections provided by UNI 3.0 signalling.

The method may be characterised by configuring all ATM hosts and MCRs, associated with the same cluster, with the address of the same MARS; operating MARS in server mode; IP/ATM endpoints, within a cluster, utilizing MARS procedures to register as a member of an inter-cluster multicast group; said MCRs supporting point-to-multipoint connections provided by UNI 3.0 signalling; and using a multicast server to manage said point-to-multipoint connections and distribute multicast traffic therefrom (i.e. as root) to all other leaves of said multipoint connections.

The method may be characterised by a MCR, in advance of multicasting selecting a well known end-node, and establishing a connection to said well known end-node, said well known end-node providing a database for ATM addresses of inter-cluster multicast group members; and by said well known end-node establishing a point-to-multipoint tree to said ATM addresses and, on receipt of a multicast packet from a member of said inter-cluster multicast group, using said tree to distribute said multicast packet to other members of said group. Each group address may have a corresponding well known end-node address.

The method may be characterised by said well known end-node forming the root of a point-to-multipoint tree when said MCRs are operating in the server mode; and by an MCR, wishing to distribute a multicast packet to members of a existing group of which it is not a member, establishing a point-to-point connection to said well-known end-node, and sending said multicast packet to said well-known end-node using the point-to-point connection; and, on receipt of said multicast packet, said well known end-node distributing said multicast packet, via an existing point-to-multipoint tree to said group members.

The method may be characterised by said MCRs operating in either a server mode, or a Virtual Circuit (VC) mesh mode, the mode used being dependent on several criteria, such as, the number of inter-cluster multicast groups, the grouping mode (i.e. sparse, dense, etc.), traffic density, charging policies of a network operator, performance, reliability and system complexity. The method may be further characterised by said MCRs operating in a server mode; said well-known end-node providing a database for IP multicast addresses, and corresponding ATM addresses for members of an inter-cluster multicast group; said MCRs issuing multicast packets to said well known end-node for distribution to members of an inter-cluster multicast group; and said well known end-node establishing a point-to-multipoint tree to said group members and using said tree to distribute multicast packets, received from said MCRs, to said group members. The method may be further characterised by said MCRs operating in VC mesh mode; said well known end-nodes keeping track of IP multicast addresses, and corresponding ATM members of said MCRs; and said IP/ATM network reporting changes in membership of an MCR to a respective well known end-node; and, on determining an association between said IP multicast addresses and said ATM members, establishing point-to-multipoint trees between MCRs belonging to the same inter-cluster multicast group(s). The method may be further characterised by said IP/ATM network establishing two control VCs between a MCR and said well-known end-node, a first one of said control VCs being a transient bi-directional point-to-point connection, between a MCR and said well-known end-node, and a second one of said control VCs being a unidirectional point-to-multipoint group_ctrl_VC, from said well-known end-node to the MCR; using said first control VC to register membership of a an inter-cluster multicast group; and using said second control VC to propagate group joining and leaving messages to the MCR.

The method may be characterised by said MCRs, at start-up, establishing a point-to-point connection with a well-known end-node; and informing said end-node of their ATM addresses and of the inter-cluster multicast groups from which they want to receive multicast traffic; on receipt of information concerning the multicast group(s) from which an MCR wants to receive multicast traffic, said well known end-node returning to said MCR, the ATM addresses which support said groups; and said MCR, on receipt of said ATM addresses, establishing point-to-multipoint connections with each of the multicast group members. The method may be further characterised by a MCR, on receipt of a multicast packet from its cluster, using said point-to-multipoint tree to forward the multicast packet to other clusters. The method may be further characterised by said IP/ATM network using a point-to-multipoint tree of a group member MCR to distribute a multicast packet originating from a non-group member to group members; and said well known end-node establishing a point-to-point connection between said non-group member and said group member MCR to facilitate transfer of said multicast packet to said group member MCR and thereafter to said group members via said point-to-multipoint tree. The method may be further characterised by a MCR, wishing to leave an inter-cluster multicast group, contacting said well-known end-node; said well known end-node, on receipt of said leaving request, propagating a leave message, in respect of said MCR, to the other MCRs on its group membership list; and each of said other MCRs, on receipt of said leave message, dropping a leaf for said leaving MCR from their respective point-to-multipoint trees. The method may be further characterised by a MCR, wishing to join an inter-cluster multicast group, contacting said well-known end-node; said well known end-node, on receipt of the joining request, returning the ATM addresses of existing group members to said new MCR and propagating the ATM address of said new MCR to existing group members, through a point-to-multipoint tree; said new MCR member, on receipt of the ATM addresses, establishing a point-to-multipoint connection to each of said existing group members; and each of said existing group members, on receipt of the ATM address of the new MCR, updating their respective point-to-multipoint trees to include a leaf for said new MCR.

The method may be characterised by said IP/ATM network operating in server mode ILMP, in conjunction with MARS; MCRs, on obtaining information concerning existing groups, propagating said information to a corresponding well known end-node, residing within an inter-cluster backbone, any one of said MCRs acting as said well known end-node for a multicast group, each group having only one well known end-node; a MCR sending group membership reports to corresponding well-known end-nodes via a transient control channel established between said MCR and the well known end-node, said control channel being released after a predetermined period of time; a MCRs establishing point-to-point data channels for tunneling multicast packets in unicast fashion and a point-to-multipoint tree for each multicast group using itself as the root of the tree; existing group members reporting their own ATM addresses to said well-known end-node when a MCR propagates information concerning the existing groups on their cluster side; and using group member IDs to eliminate multicast packet reflections, said IDs being assigned by said well known end-node. The method may be further characterised by MCRs selecting a well known end-node for a particular inter-cluster multicast group by invoking algorithmic mapping of multicast addresses and corresponding well known end-nodes.

The method may be characterised by an ATM host, wishing to transmit a multicast packet to members of a multicast group, sending said packet to a Multicast Server (MCS) entity; on receipt of said packet, said MCS coping the packet to all its interfaces where there are group members within the cluster, including the MCR (since MCRs behave promiscuously) and unicasting said multicast packet to a corresponding well known end-node via a preestablished data channel; and, if said multicast group is reported to said well-known end-node, said well known end-node extracting the multicast packet from the unicast packet and sending the extracted multicast packet to group members using its point-multipoint tree to said members. The method may be further characterised by a MCS wishing to participate in a multicast group, configuring two addresses, namely, ATM addresses of primary and secondary (back-up) well known end-nodes. The method may be further characterised by a MCR maintaining a single bi-directional-control connection to the well-known end-node for registration/deregistration purposes; a single data unidirectional data channel for tunneling multicast packets; and a number (N) of incoming multicast VCs, where N is the total number of multicast groups.

The method may be characterised by, in the event of failure of a primary well known end-node, dismantling all point-to-point connections between the MCS routers and said primary well-known end-node; the MCRs, on detecting dismantlement of said connections, opening a new circuit to a back-up, pre-configured, well known end-node; each MCR registering the ATM addresses of the group members of which it is aware to the back-up well known end-node; said back-up well known end-node, on receipt of the ATM addresses, establishing point-multipoint trees or each group; said MCRs continuously try to reestablish a connection with said primary well known end-node; and on reestablishment of said connection, said MCRs dismantle their connection to said back-up well known end-node and re-establish their connection to said primary well known end-node.

According to a further aspect of the present invention, there is provided, a telecommunication system, characterised in that said system includes an ATM transmission system as outlined in preceding paragraphs, or is adapted to operate in accordance with the method, outlined in preceding paragraphs.

BRIEF DESCRIPTION OF THE DRAWINGS

The foregoing and other features of the present invention will be better understood from the following description with reference to the accompanying drawings, in which.

DESCRIPTION OF THE PREFERRED EMBODIMENTS

In order to facilitate an understanding of the present invention a glossary of terms used in this patent specification is provided below:
ATM: Asynchronous Transfer Mode
CMP: Cluster Multicasting Protocol
IETF: Internet Engineering Task Force
ILMP: Inter-cluster Multicast Protocol
IP: Internet Protocol
LIS: Logical IP System/Subnet
MARS: Multicast Address Resolution Service
MCR: Multicast Router
MCS: Multicast Server
RFC: Request for Comment
UNI: User-Network Interface
VC: Virtual Circuit
VCI: Virtual Channel Identifier
VPI: Virtual Path Identifier It will be seen from the subsequent description of the present invention that:
  the invention is concerned with inter-cluster multicasting;
  multicasting within a cluster utilizes IETF MARS;
  a cluster is a collection of ATM hosts and routers that belong to the same domain;
  a cluster may comprise a plurality of Logical IP Systems (LISs); and
  the size of a cluster depends on physical and administrative constraints, but, when choosing the size of a cluster, implementation is a very important consideration.

In essence, an ATM transmission system of the present invention is adapted for the simultaneous transmission (i.e. multicasting) of IP data packets to a plurality of system users, using ATM as a carrier network, and includes:
  an IP/ATM network including clusters of Logical IP Systems (LISs), a cluster being adapted to support a number of ATM hosts and being of a size that is dependent on physical and administrative constraints;
  a multicast address resolution server (MARS) for each cluster, all ATM hosts within a cluster, even if supported by different LISs, are adapted to be configured with an address of the same MARS; and
  a multicast router (MCR) for each cluster, the functionality of MCR and MARS may be co-located for each cluster.

The clusters are interconnected through the MCRs which form an inter-cluster backbone for the IP/ATM network and the multicasting of IP data packets within a cluster utilizes a MARS protocol, whilst multicasting between clusters utilizes an inter-cluster multicasting protocol (ILMP). The ATM transmission system includes means for gaining access to the Internet, for example, a non-ATM IP Subnet connected to the inter-cluster backbone. Alternatively, one of the MCRs may be adapted for use as an entry point for the IP/ATM network to the Internet.

It is not recommended to have a very large number of end-systems in a cluster because this may cause performance degradation and difficulty in managing very large groups. Intra-cluster communication between group members occurs directly (shortcut), whereas inter-cluster communication is effected through a router having a multicasting capability. The use of multicast routers as an aggregation point for inter-cluster communication helps to reduce the number of virtual connections, as well as the signalling load on the end-systems.

Figure 1:
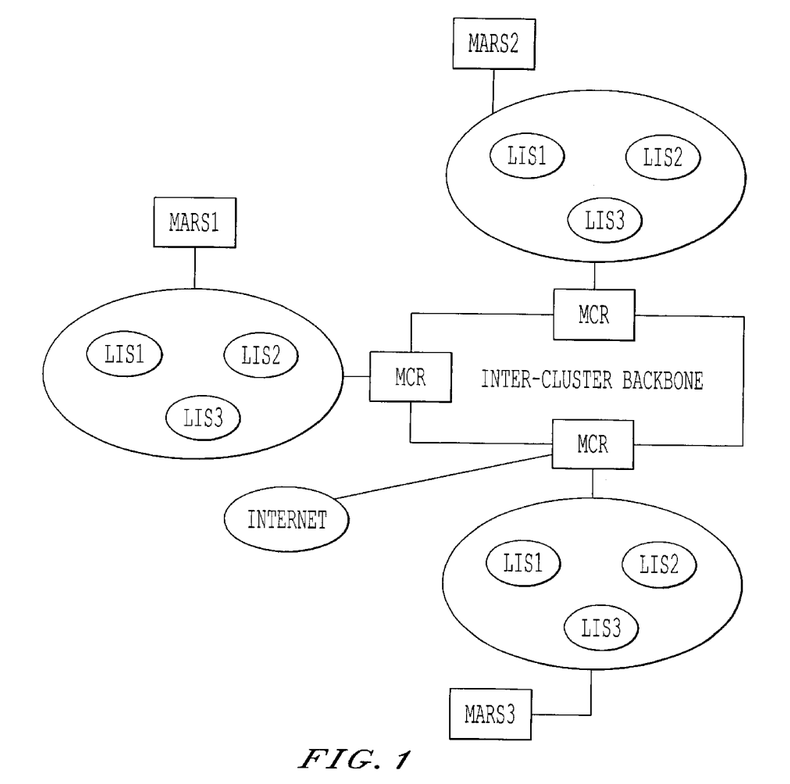
FIG. 1 diagrammatically illustrates, in the form of a block diagram, an architecture for an inter-cluster multicasting network.

The architecture for an inter-cluster multicasting network of the present invention, which is diagrammatically illustrated, in the form of a block diagram, in FIG. 1 of the accompanying drawings, includes three clusters, each one of which includes three Logical IP Systems, $LIS_1$, $LIS_2$ and $LIS_3$. As illustrated in FIG. 1, each cluster has an address resolution server associated therewith, namely, $MARS_1$, $MARS_2$ and $MARS_3$, and a multicast router (MCR). The three clusters are interconnected through the multicast routers (MCRs) which form an inter-cluster backbone for the network. One of the MCRs is used as an entry point for the network to the Internet.

Intra-cluster communication is largely based on the MARS architecture, the only deviation being that the current MARS architecture assumes that each cluster corresponds to only one LIS whereas, with the arrangement of FIG. 1, each cluster encompass multiple LISs. It will be seen from the subsequent description that mapping multiple LISs to one cluster can be readily achieved. MARS is fully documented in RFC 2022, published by IETF, and its details will not, therefore, be described in this patent specification.

The assumptions that have been made in relation to the architecture of the inter-cluster multicasting network of FIG. 1 are that:
  (a) The architecture uses, by and large, MARS protocol for intra-cluster multicasting and ILMP for inter-cluster multicasting;
  (b) A cluster consists of an integral number of hosts and LISs. For each cluster there is one address resolution server (MARS) and one multicast router (MCR). Although the functionality of MARS and MCR can, as previously stated, be co-located.
  (c) For scalibility and reliability reasons it is possible to physically distribute the functionality of MARS within a cluster.
  (d) All ATM hosts residing on the same cluster, even if they belong to different LISs, are configured with the address of the same MARS.
  (e) MARS operates in server mode. Virtual Circuit (VC) mesh mode, as such, is not addressed in this patent specification because it is not necessary for an understanding of the present invention.
  (f) In the presence of multiple MCRs belonging to the same cluster, the MCR with the highest IP address is chosen as the default MCR.
  (g) MCRs promiscuously receive all multicast traffic on a Cluster.
  (h) The multicast routers (MCRs) support point-to-multipoint (pt-to-mpt) connections provided by UNI 3.0 signalling only.
  (i) There is a corresponding well known end-node address for each group address.
  (j) Well known routers are selected algorithmically, as described in the subsequent description of the present invention.
  (k) A sender can send packets to a multicast group even if the sender is not a member of the group.

The manner in which the inter-cluster multicasting network of FIG. 1 operates will now be described. Within a cluster, IP/ATM endpoints that would like to join a multicasting group, use the MARS procedures to register. All ATM hosts (and multicast routers), belonging to the same cluster, are configured with the address of the same MARS. A multicast server entity (assuming that MARS operates in server mode) manages the point-to-multipoint connections, and distributes the multicast traffic from itself (root) to all other leaves.

As illustrated in FIG. 1, the MCRs inter-connect, or act as aggregation points between, clusters. In operation, an MCR selects a well known end-node with which it establishes communication, in advance of the multicasting process. The procedures used to select a well known end-node are outlined in the subsequent description. The function of the well known end-node is that it serves as a database for the ATM addresses of the members of an inter-cluster multicast group. The well known end-node is adapted to establish a point-to-multipoint tree and to distributing multicast traffic sent by a member of the inter-cluster multicast group to other members of the multicast group using the tree, i.e. the end-node acts as the root of the tree and is adapted to send IP multicast data packets, across the cluster boundaries, to the leaves of the tree, each one of which is the ATM address of an existing group member. Thus, in the server mode, the selected well known end-node distributes the multicast traffic, sent by any member of the multicast group, to other members of the group via a previously constructed point-to-multipoint tree.

A MCR is adapted to operate in two different modes, namely a Virtual Circuit (VC) mesh mode and a server mode. Both modes of operation have their advantages and disadvantages and the operation mode which is chosen depends on several criteria, such as:

the number of inter-cluster multicast groups;

the grouping mode, i.e. sparse, dense, etc.;

traffic density;

charging policies of the network operators;

performance;

reliability;

complexity, etc.

In the VC mesh mode, the well-known end-nodes are adapted to keep track of the IP multicast addresses, and the corresponding ATM members of the MCRs [{|P1: ATM1, ATM2, ... ATMN}, {|P2: ATMI, ATM2, ... ATMN}, ... {|PN: ATM1, ATM2, ... ATMN}]. Each and every change in membership of an MCR is reported to the well-known end-node. Once the association between the IP multicast addresses and ATM members is determined, point-to-multipoint trees are established between each MCR belonging to the same inter-cluster multicast group(s). A Virtual Circuit (VC) mesh for a number of MCRs is diagrammatically illustrates, in form of a block diagram, in FIG. 2 of the accompanying drawings.

In the server mode, the well-known end-node, in addition to being a database for the IP multicast addresses, and the corresponding ATM addresses, is adapted to relay multicast packets to members of an inter-cluster multicast group. MCRs are adapted to issue multicast packets to the well-known end-node, in unicast fashion, for distribution to members of the inter-cluster multicast group. A well known end-node is adapted to establish a point-to-multipoint tree to members of an associated inter-cluster multicast group, and to distribute multicast packets, received from a MCR, to group members using the tree. In other words, a point-to-multipoint tree is constructed from the well-known end-node to each of the group members, and multicast packets, received from a MCR, are forwarded to the group members via the point-to-multipoint (pt-to-mpt) tree.

In the VC mesh mode (or source routed point-to-multipoint), there are two control VCs between a MCR and the well-known end-node, which are as follows:

(1) a transient bi-directional point-to-point connection, between a MCR and the well-known end-node, to register group membership; and (2) a unidirectional pt-to-mpt group_ctrl_VC, from the well-known end-node back to the MCR, to propagate group join and leave messages.

At start-up, the MCRs establish a point-to-point connection with the well-known end-node and inform the well known end-node of their ATM addresses, as well as the multicast groups from whom they want to receive traffic. The well known end-node, in turn, returns the ATM addresses to the MCRs which support the same groups. Once the MCRs receive the ATM addresses of the other group members, they open up point-to-multipoint connections with each of the multicast MCR group members. At the end of this process, initialization will have been effected and a bidirectional tree will have been constructed for every group.

Figure 2:
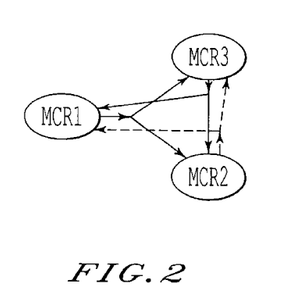
FIG. 2 diagrammatically illustrates, in form of a block diagram, a Virtual Circuit (VC) mesh for a number of MCRs.

When a MCR promiscuously receives a multicast packet from its cluster, it uses the previously constructed point-to-multipoint tree, as described above, to forward the multicast packet to other clusters, as is diagrammatically illustrated in FIG. 2 of the accompanying drawings, i.e. every group member manages a point-to-point tree.

Figure 3:
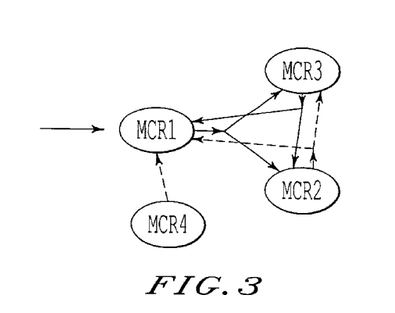
FIG. 3 diagrammatically illustrates, in the form of a block diagram, the VC mesh of FIG. 2 of the drawing, including an MCR for a non-group member sending a packet to a multicast group.

In those situations, as is diagrammatically illustrated in FIG. 3 of the accompanying drawings, where a non-group member, i.e. a sender (ATM host) within a particular cluster having a Multicast Router, $MCR_4$, wishes to send a multicast packet to an inter-cluster multicast group which has members in other clusters to which the sender belongs, the Multicast Router, $MCR_4$, issues a query to the well-known end-node to find out if the group exists in other clusters. The well-known end-node, on receipt of this query, returns the ATM address of an "appropriate" group member to which it establishes a point-to-point connection. The non-member $MCR_4$ then tunnels the multicast packet, in unicast fashion, to the "appropriate" group member (root). As is diagrammatically illustrated in FIG. 3, the "appropriate" group member (root) is $MCR_1$ which, on receipt of the multicast packet from $MCR_4$, forwards the packet through its point-to-multipoint connections to the other Multicast Routers, $MCR_2$ and $MCR_3$.

A Multicast Router (MCR), wishing to leave a group, simply contacts the well-known end-node which, in turn, propagates a leave message, in respect of that MCR, to the other MCRs on its group membership list. On receipt of the leave message, each of the MCRs drop the leaf for the leaving MCR from their point-to-multipoint trees.

A Multicast Router (MCR), wishing to join an existing multicast group, simply contacts the well-known end-node. On receipt of the request to join the group, the well-known end-node returns the ATM addresses of the existing group members, and the new MCR member, on receipt of the addresses, establishes a point-to-multipoint connection to each of the existing group members. At the same time, the well-known end-node propagates the ATM address of the newly joined MCR to the other group members, through the point-to-multipoint tree, to enable the existing members to update their trees to include a leaf for the new MCR member.

Figure 4:
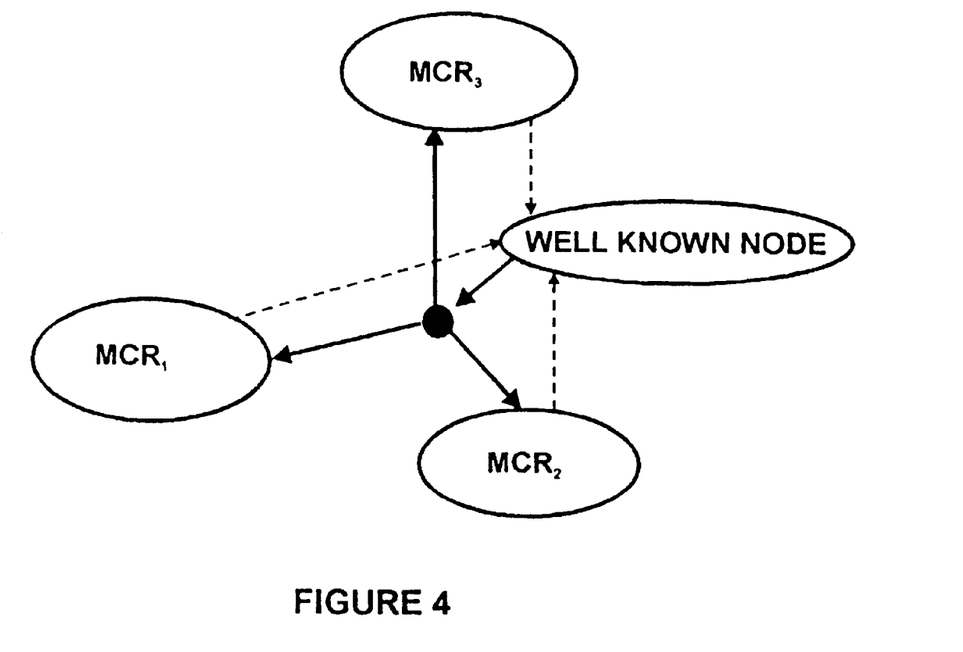
FIG. 4 diagrammatically illustrates, in the form of a block diagram, a point-to-multipoint tree constructed from a known node to all members of a multicast group.

As is diagrammatically illustrated in FIG. 4 of the accompanying drawings, the well known end-node forms the root of the point-to-multipoint tree when the MCRs are operating in the server mode. In other words, in server mode, the well know end-node, on receipt of the list of groups, establishes a point-to-multipoint tree back to the group members, $MCR_1$ $MCR_2$ and $MCR_3$. In this case, if there is a new incoming MCR member to an existing MCR group, a membership notification is sent to the well-known end-node which simply adds the new MCR member to its point-to-multipoint tree. When a MCR member wishes to terminate its membership of an existing group, the MCR issues a notification to the well-known end-node which drops the leaf for that MCR from its point-to-multipoint tree.

MCRs, wishing to distribute multicast packets, who are not members of any existing group can simply establish a connection to the well-known end-node which will thereafter distribute the multicast packet, via the point-to-multipoint tree managed by the well know end node.

The detailed operation of a server mode ILMP, in conjunction with MARS, will now be described. End-systems, within a cluster, use MARS procedures (MARS-REQUEST, MARS_MULTI, MARS_NAK, etc.) to register their ATM addresses and the list of the addresses of the groups they wish to join. The MARS entity, operating in the server mode, will itself establish point-to-multipoint tree prior to packet transmission. Information concerning the detailed operation of MARS is given in IETF RFC 2022.

It is assumed that an MCR obtains knowledge of existing groups (not members) within a cluster. This is readily achievable when MARS and the MCR are co-located. Thus, the detailed operation of the server mode ILMP, in conjunction with MARS, will be as follows:

(1) Once the MCR obtains information concerning existing groups, it propagates this information to a corresponding well known end-node that resides within the inter-cluster backbone (see FIG. 1 of the accompanying drawings).

Membership reports from MCRs to the well-known end-nodes are sent through a transient control channel. This control channel is released after a predetermined time.

(2) The MCRs also establish a point-to-point data channel for tunneling multicast packets in unicast fashion. Finally, the MCRs establish a point-to-multipoint tree for every group from itself back to its leaves, i.e. MCRs.

(3) Any of the MCRs can act as the well-known end-node but for a given group there is only one well-known end-node. When a MCR propagates the existing groups on their cluster side, the existing group members report their own ATM addresses to the well-known end-node.

(4) A 16 bit extended encapsulation carrying a 16-bit cluster member ID is used (as proposed in MARS) to solve the packet reflection problem. This ID is assigned by the well-known end-node.

Multicast forwarding is effected as follows:

(1) When a host wishes to transmit a multicast packet, it sends the packet to a Multicast Server (MCS) entity, which copies the packet to all its interfaces where there are group members within the cluster, including the MCR (since MCRs behave promiscuously).

(2) The multicast packet is unicast to the well known end-node via the preestablished data channel.

(3) If a multicast group is reported to the well-known end-node, after extracting the multicast packet from the unicast packet, the well known end-node will simply issue the packet through its point-multipoint tree.

A MCS wishing to participate in a multicast group, only needs to configure two addresses, namely, the ATM addresses of the primary and the secondary (back-up) well known end-nodes.

Thus, the total number of circuits that will be maintained by any router will be as follows:

a single bi-directional-control connection to the well-known end-node for registration/de-registration purposes;

a single data unidirectional data channel for tunneling multicast packets; and a number (N) of incoming multicast VCs, where N is the total number of multicast groups.

The manner in which a well known end-node is selected will now be described. It is assumed that, within the multicast backbone, there are a number of well-known end-nodes each serving for a multicast group prefix. Mapping of multicast addresses and corresponding well-known end-nodes can be performed algorithmically. Given a group address and a set-of well-known end-nodes, the algorithm will return the well-known end-node to be used for a group. Disregarding where the algorithm is executed, the same well-known end-node will always be returned for a given group. In practice, the routers at the edge of the multicast backbone, i.e. the MCRs, invoke the algorithmic mapping to select a well-known end-node for a particular group.

In order to ensure that the well known end-node is not a single point of failure, a back-up node is provided which is adapted, in the event of failure of a well known end-node, to take over from the failed well known end-node.

Thus, if a well known end-node fails, for whatever reason:

all point-to-point connections between the MCS routers and the well-known end-node are dismantled;

the routers, on detecting that the connections have been dismantled, are adapted to open a new circuit to a back-up (pre-configured) well known end-node, assuming that the ATM address of the back-up well known end-node is also known a priori;

thereafter, each of the MCRs register the ATM addresses of the group members of which it is aware to the back-up well known end-node; and on receipt of the ATM addresses, the back-up well known end-node establishes point-multipoint trees for each group.

It should be noted that, in general, multicast servers constitute a single point of failure and, in this respect, the server mode is weaker than the VC mesh mode.

In practice, routers will continuously try to establish a connection with the primary well known end-node. Whenever this succeeds, the routers are adapted to dismantle their connection to the back-up well known end-node and re-establish their connection to the primary end-node.

Consider an example scenario for a network architecture adapted to provide inter-cluster communication, i.e. adapted to operate in server mode ILMP, in conjunction with MARS, in which there are two multicast groups, each including a number of ATM hosts, namely, group G1 and group G2, which are as follows:

G1: $\{ATM_1, ATM_2, ATM_3, ATM_4, ATM_5\}$; and

G2: $(ATM_1, ATM_2, ATM_{10}\}$;

and three clusters:

$CLUSTER_x$: $ATM_1, ATM_2, ATM_3, ATM_4$;

$CLUSTER_y$: $ATM_5, ATM_6, ATM_7$; and $CLUSTER_z$: $ATM_8, ATM_9, ATM_{10}$

Figure 5:
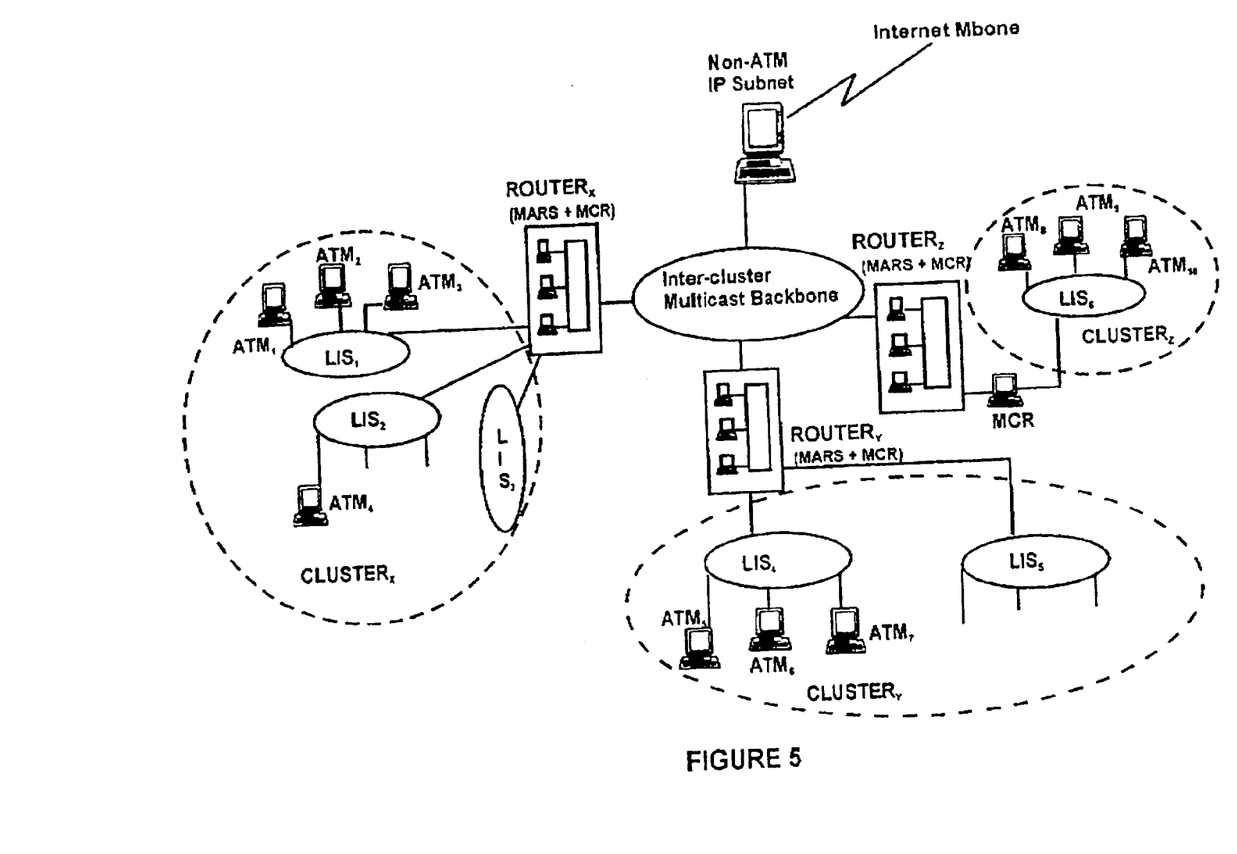
FIG. 5 diagrammatically illustrates, in the form of a block diagram, an example scenario for a network architecture adapted to provide inter-cluster communication, where each cluster consists of multiple LISs.

FIG. 5 of the accompanying drawings diagrammatically illustrates such a scenario, in the form of a block diagram, in which the three clusters, $CLUSTER_x$, $CLUSTER_y$ and CLUSTER$_z$, each include a number of LISs, which each have a number of ATM hosts connected thereto. In this example, CLUSTER$_x$, includes three LISs, LIS$_1$ to LIS$_3$, CLUSTER$_y$ includes two LISs, LIS$_4$ and LIS$_5$, and CLUSTER$_z$ includes one LIS, LIS$_6$. The LISs of CLUSTER$_x$ are connected to a ROUTER$_x$, the LISs of CLUSTER$_y$ are connected to a ROUTER$_y$ and the LIS of CLUSTER$_z$ is connected to a ROUTER$_z$ via a MCR.

Each Router (MARS plus MCR) is connected to an Inter-cluster Multicast Backbone, as is a non-ATM IP Subnet for providing entry to the Internet.

All IP hosts set up a bi-directional control channel to their respective MCRs (ROUTERS$_{x-z}$) for registration/de-registration purposes. Hosts register their ATM addresses, as well as the IP multicast groups they wish to be a member of through a respective channel. This channel is dismantled if not used for a predetermined period of time. ROUTERS$_{x-z}$ keep track of {layer 3, ATM$_1$, ATM$_2$, ATM$_3$, . . . ATM$_N$} mappings. For each and every registration request, the ROUTERS$_{x-z}$ open a point-to-multipoint tree to all their respective members.

At the end of this phase:

ROUTER$_x$ will have an entry in its mapping table similar to:

[{G1: ATM$_1$, ATM$_2$, ATM$_3$, ATM$_4$, ROUTER$_x$}, {G2: ATM$_1$, ATM$_2$, ROUTER$_x$}];

ROUTER$_y$ will have an entry in its mapping table similar to:

[{G1: ATM$_5$, ROUTER$_y$}]; and

ROUTER$_z$ will have en entry in its mapping table similar to:

[{ATM$_{10}$, ROUTER$_z$}].

The ROUTERS$_{x-z}$ will also propagate existing groups, within the clusters, to a wide-area in the following manner:

(1) A Router sets up a point-to-point connection to a well-known end-node and informs all multicast groups of which it wants to be a member, of its ATM address; and (2) The well known end-node, on receipt of this information, sets up a point-to-multipoint tree for each group.

According to the example given above, there will be one point-to-multipoint tree for G1, starting from a well-known end-node to ROUTER$_x$ and ROUTER$_y$ and one point-to-multipoint tree for G2, starting from a well-known end-node to ROUTER$_x$ and ROUTER$_z$.

When an ATM host, for example, ATM$_1$, wishes to send a multicast packet to group G1:

the multicast packet is sent to a MCS within the cluster, i.e. CLUSTER$_x$;

the MCS copies the packet to its internal point-to-multipoint channel (VPI/VCI$_x$) leading to hosts ATM$_1$ ATM$_2$, ATM$_3$, ATM$_4$, as well as to the well known end-node;

the well known end-node, on receipt of the copied multicast packet, distributes the packet to ROUTER$_x$ ROUTER$_y$;

the ROUTER$_y$ distribute the incoming multicast packet to its internal interfaces, i.e. ATM$_5$, which resides within its own CLUSTER$_y$; and the packet that will be reflected to ROUTER$_x$ is discarded using the extended encapsulation mechanism, referred to in a preceding paragraph.

The procedure to be followed when a host wishes to leave a group will now be described, by way of example, for the case where host, ATM$_1$ from CLUSTER$_x$ and host, ATM$_{10}$, from CLUSTER$_z$ decide to leave the group G2:

the host, ATM$_1$, issues a leave request to ROUTER$_x$ and host, ATM$_{10}$, issues a leave request to ROUTER$_z$;

on receipt of the leave request, ROUTER$_x$ and ROUTER$_z$ respectively delete the leaves for hosts, ATM$_1$ and ATM$_{10}$, from their internal tree;

at the same time, ROUTER$_z$ detects that there are no group members left in CLUSTER$_z$ for group G2 and sends a leave request to the well known end-node; and the well known end-node, on receipt of the leave request, removes ROUTER$_z$ from its tree for G2.

It will be seen from the foregoing description that multicasting inside a cluster uses the IETF MARS (Multicast Address Resolution Service) protocol and that, in accordance with the present invention, an inter-cluster multicasting protocol (CMP) in used for the multicasting of IP data packets between clusters. The CMP protocol implies that there are gateways between clusters to spread the multicast address to other gateways and that the multicast traffic flow is such that multicast messages, leaving a cluster, are only transmitted to gateways where multicast (group) members exist. Each group has a predetermined unit, i.e. a well known end-node, with which respective gateways are associated. After registering group addresses to chosen well known end-nodes, if a gateway sees that there are members spread to other clusters they will set up point-to-multipoint ATM connections between gateways. Each gateway belonging to the same multicast group will later set up a point-to-multipoint connection to the rest of the members. Multicast packages, transmitted to a group, are not copied between clusters if there are no members therein, i.e. the packages are copied locally. To increase reliability and redundancy, a back-up node is used. If the node goes down, the gateways set up a new ATM connection between themselves from the information they have collected from the first registration.

Each gateway is configured with a number of IP addresses particular to a number of predetermined nodes. There may also be a number of predetermined nodes where each node serves a segment of existing multicast group addresses. The mapping of a multicast address and the associated predetermined node is algorithmic.

The present invention is primarily intended to be used in IP/ATM exchanges/gateways and the use of an inter-cluster multicasting protocol will enable a multicast message service to provided to up to 65,000 users.

What is claimed is:

1. An ATM transmission system, adapted for the simultaneous transmission of IP data packets to a plurality of system users, using ATM as a carrier network, said transmission system includes:

an IP/ATM network including clusters of Logical IP Systems (LISs);

a multicast address resolution server (MARS) for each cluster; and a multicast router (MCR) for each cluster, in that said clusters are interconnected through said MCRs which form an inter-cluster backbone for said IP/ATM network, in that multicasting of IP data packets within a cluster utilizes a MARS protocol, and in that multicasting between clusters utilizes an inter-cluster multicasting protocol (ILMP), wherein a MCR is adapted, in advance of multicasting, to select a well known end-node using a selection algorithm that returns a same well known end-node for an inter-cluster multicast group when executed by any of said MCRs and to establish a connection to the well known end-node, said well known end-node being adapted to provide a database for ATM addresses of members of the inter-cluster multicast group, and in that said well known end-node is adapted to establish a point-to-multipoint tree and to distribute multicast traffic sent by a member of said inter-cluster multicast group to other members of said group using said tree.

2. An ATM transmission system, as claimed in claim 1, further comprising an entry point configured to provide access to the Internet.

3. An ATM transmission system, as claimed in claim 2, wherein one of said MCRs is adapted for use as the entry point to the Internet.

4. An ATM transmission system, as claimed in claim 2, wherein said entry point to the Internet includes a non-ATM IP Subnet connected to said inter-cluster backbone.

5. An ATM transmission system, as claimed in claim 1, wherein each cluster consists of an integral number of ATM hosts and LISs, and a size of a cluster being dependent on physical and administrative constraints, and in that each LIS, within a cluster, is adapted to support a number of ATM hosts, and in that all ATM hosts within a cluster, even if supported by different LISs, are adapted to be configured with an address of a same MARS.

6. An ATM transmission system, as claimed in claim 1, wherein, for each cluster, functionality of MARS and MCR is adapted to be co-located.

7. An ATM transmission system, as claimed in claim 1, wherein, in the presence of multiple MCRs belonging to a same cluster, said IP/ATM network is adapted to select a MCR with a highest IP address as a default MCR.

8. An ATM transmission system, as claimed in claim 1, wherein MARS is adapted to operate in server mode.

9. An ATM transmission system, as claimed in claim 1, wherein said MCRs are adapted to promiscuously receive all multicast traffic on a cluster.

10. An ATM transmission system, as claimed in claim 1, wherein said MCRs are adapted to support point-to-multipoint connections provided by UNI 3.0 signalling.

11. An ATM transmission system, as claimed in claim 1, wherein all ATM hosts and MCRs, associated with a same cluster, are adapted to be configured with an address of a same MARS, in that MARS is adapted to operate in server mode, in that said IP/ATM network is adapted to enable IP/ATM endpoints, within a cluster, to register as a member of an inter-cluster multicast group utilizing MARS procedures, in that said MCRs are adapted to support point-to-multipoint connections provided by UNI 3.0 signalling, and in that a multicast server is provided and adapted to manage said point-to-multipoint connections, and to distribute multicast traffic therefrom to all other leaves of said point-to-multipoint connections.

12. An ATM transmission system, as claimed in claim 1, wherein each group address has a corresponding well known end-node address.

13. An ATM transmission system, as claimed in claim 1, wherein said IP/ATM network is adapted to enable multicast packets to be sent to members of an inter-cluster multicast group, even if a sender is not a member of said group.

14. An ATM transmission system, as claimed in claim 1, wherein said MCRs are adapted to operate in either a server mode, or a Virtual Circuit (VC) mesh mode, dependent on criteria, including a number of inter-cluster multicast groups, a grouping mode, traffic density, charging policies of a network operator, performance, reliability, and system complexity.

15. An ATM transmission system, as claimed in claim 14, wherein said MCRs are adapted to operate in the server mode, wherein said well-known end-node is adapted to provide the database for ATM addresses for members of the inter-cluster multicast group, in that said MCRs are adapted to issue multicast packets to said well known end-node for distribution to members of the inter-cluster multicast group, and in that said well known end-node is adapted to establish the point-to-multipoint tree to said group members and to distributing multicast packets, received from said MCRs, to said group members using said tree.

16. An ATM transmission system, as claimed in claim 14, wherein said MCRs are adapted to operate in the VC mesh mode wherein said well known end-nodes are adapted to keep track of IP multicast addresses, and corresponding ATM members of said MCRs, and said IP/ATM network is adapted to report changes in membership of an MCR to a respective well known end-node, and to establish point-to-multipoint trees between MCRs belonging to a same inter-cluster multicast group, when an association between said IP multicast addresses and said ATM members has been determined.

17. An ATM transmission system, as claimed in claim 16, wherein said IP/ATM network includes a first control VC and a second control VC between the MCR and said well-known end-node, wherein the first control VC is a transient bi-directional point-to-point connection between the MCR and said well-known end-node, and is adapted for use in registering group membership, and wherein the second control VC is a unidirectional point-to-multipoint group-ctrl-VC from said well-known end-node to the MCR, and is adapted to propagate group joining and leaving messages to the MCR.

18. An ATM transmission system, as claimed in claim 12, wherein said IP/ATM network is adapted to enable a multicast packet originating from a non-group member to be distributed to group members using a point-to-multipoint tree of a group member MCR and said well known end-node is adapted to establish a point-to-point connection between said non-group member and said group member MCR to facilitate a transfer of said multicast packet to said group member MCR and thereafter to said group members via said point-to-multipoint tree.

19. An ATM transmission system, as claimed in claim 1, wherein said IP/ATM network is adapted to enable a MCR to join, or leave, an inter-cluster multicast group, at an option of the MCR.

20. In an ATM transmission system including an IP/ATM network, said network including clusters of Logical LP Systems (LISs), a multicast address resolution server (MARS) for each cluster and a multicast router (MCR) for each cluster, a method for a simultaneous transmission of IP data packets to a plurality of system users using ATM as a carrier network, said clusters are interconnected through said MCRs to form an inter-cluster backbone for said IP/ATM network, by using a MARS protocol for multicasting said IP data packets within a cluster, and by using an inter-cluster multicasting protocol (ILMP) for multicasting said IP data packets between clusters, said method comprising:

selecting a well known end-node using a selection algorithm that returns a same well known end-node for an inter-cluster multicast group when executed by any of said MCRs, in advance of multicasting;

establishing a connection to said well known end-node in advance of multicasting, said well known end-node providing a database for ATM addresses of members of an inter-cluster multicast group; and said well known end-node:
establishing a point-to-multipoint tree to said ATM addresses; and
using said tree to distribute a multicast package to other members of said group on receipt of a multicast packet from a member of said inter-cluster multicast group.

21. The method, as claimed in claim 20, further comprising obtaining access to the Internet for said IP/ATM network.

22. The method, as claimed in claim 20, wherein said IP/ATM network, in a presence of multiple MCRs belonging to a same cluster, selecting a MCR with a highest IP address as a default MCR.

23. The method, as claimed in claim 20, further comprising MARS operating in server mode.

24. The method, as claimed in claim 20, further comprising said MCRs promiscuously receiving all multicast traffic on a cluster.

25. The method, as claimed in claim 20, further comprising said MCRs supporting point-to-multipoint connections provided by UNI 3.0 signalling.

26. The method, as claimed in claim 20, further comprising:
configuring all ATM hosts and MCRs, associated with a same cluster, with an address of a same MARS;
operating the same MARS in server mode;
IP/ATM endpoints, within a cluster, utilizing MARS procedures to register as a member of the inter-cluster multicast group;
said MCRs supporting point-to-multipoint connections provided by UNI 3.0 signalling; and
managing said point-to-multipoint connections and distributing multicast traffic to all other leaves of said point to-multipoint connections using a multicast server.

27. The method, as claimed in claim 20, further comprising each group address having a corresponding well known end-node address.

28. The method, as claimed in claim 20, further comprising:
said well known end-node forming a root of a point-to-multipoint tree when said MCRs are operating in a server mode; and
an MCR, wishing to distribute a multicast packet to members of an existing group of which it is not a member:
establishing a point-to-point connection to said well-known end-node; and
sending said multicast packet to said well-known end-node using the point-to-point connection; and
on receipt of said multicast packet, said well known end-node distributing said multicast packet, via an existing point-to-multipoint tree to said group members.

29. The method, as claimed in claim 20, further comprising said MCRs operating in either a server mode, or a Virtual Circuit (VC) mesh mode, dependent on criteria, including a number of inter-cluster multicast groups, a grouping mode, traffic density, charging policies of a network operator, performance, reliability and system complexity.

30. The method, as claimed in claim 29, further comprising:
said MCRs operating in a server mode;
said well-known end-node providing the database for ATM addresses for members of the inter-cluster multicast group;
said MCRs issuing multicast packets to said well known end-node for distribution to members of the inter-cluster multicast group; and
said well known end-node:
establishing a point-to-multipoint tree to said group members; and
using said tree to distribute multicast packets, received from said MCRs, to said group members.

31. The method, as claimed in claim 29, further comprising:
said MCRs operating in the VC mesh mode;
said well known end-nodes keeping track of IP multicast addresses, and corresponding ATM members of said MCRs; and
said IP/ATM network:
reporting changes in membership of an MCR to a respective well known end-node; and
on determining an association between said IP multicast addresses and said ATM members, establishing point-to-multipoint trees between MCRs belonging to a same inter-cluster multicast group.

32. The method, as claimed in claim 31, said IP/ATM network performing further steps comprising:
establishing a first control VC and a second control VC between the MCR and said well-known end-node, the first control VC being a transient bi-directional point-to-point connection between the MCR and said well-known end-node and the second control VC being a unidirectional point-to-multipoint group-ctrl-VC from said well-known end-node to the MCR;
using said first control VC to register membership of the inter-cluster multicast group; and
using said second control VC to propagate group joining and leaving messages to the MCR.

33. The method, as claimed in claim 30, wherein said MCRs, at start-up performing steps of:
establishing a point-to-point connection to said well-known end-node; and
informing said well-known end-node of their ATM addresses and of an inter-cluster multicast group from which they want to receive multicast traffic;
on receipt of information concerning the multicast group from which an the MCR wants to receive multicast traffic, said well known end-node returning to said MCR, the ATM addresses which support said group; and
said MCR, on receipt of said ATM addresses, establishing point-to-multipoint connections with each of the multicast group members.

34. The method, as claimed in claim 33, further comprising a MCR, on receipt of a multicast packet from its cluster, using said point-to-multipoint tree to forward the multicast packet to other clusters.

35. The method, as claimed in claim 33, further comprising:
said IP/ATM network using a point-to-multipoint tree of a group member MCR to distribute a multicast packet originating from a non-group member to group members; and
said well known end-node establishing a point-to-point connection between said non-group member and said group member MCR to facilitate transfer of said multicast packet to said group member MCR and thereafter to said group members via said point-to-multipoint tree.

36. The method, as claimed in claim 33, further comprising:
- a leaving MCR, wishing to leave an inter-cluster multicast group, contacting said well-known end-node;
- said well known end-node, upon being contacted by said leaving MCR, propagating a leave message, in respect of said leaving MCR, to the other MCRs on its group membership list; and
- each of said other MCRs, on receipt of said leave message, dropping a leaf for said leaving MCR from their respective point-to-multipoint trees.

37. The method, as claimed in claim 33, further comprising:
- a new MCR, wishing to join an inter-cluster multicast group, contacting said well-known end-node;
- said well known end-node, request upon being contacted by said new MCR:
  - returning ATM addresses of existing group members to said new MCR; and
  - propagating an ATM address of said new MCR to existing group members, through a point-to-multipoint tree;
- said new MCR, on receipt of the ATM addresses, establishing a point-to-multipoint connection to each of said existing group members; and
- each of said existing group members, on receipt of the ATM address of the new MCR, updating their respective point-to-multipoint trees to include a leaf for said new MCR.

38. The method, as claimed in claim 29, further comprising:
- said IP/ATM network operating in server mode ILMP, in conjunction with MARS;
- MCRs, on obtaining information concerning existing groups, propagating said information to a corresponding well known end-node residing within an inter-cluster backbone, any one of said MCRs acting as said well known end-node for a multicast group, each group having only one corresponding well known end-node;
- a MCR sending group membership reports to the corresponding well-known end-node via a transient control channel established between said MCR and the corresponding well known end-node, said control channel being released after a predetermined period of time;
- the MCR performing steps of:
  - establishing point-to-point data channels for tunneling multicast packets in unicast fashion; and
  - establishing a point-to-multipoint tree for each multicast group using itself as the root of the tree;
- each existing group member reporting their own ATM address to said corresponding well-known end-node when the MCR propagates information concerning an existing group on their cluster side; and
- using group member IDs to eliminate multicast packet reflections, said IDs being assigned by said corresponding well known end-node.

39. The method, as claimed in claim 38, further comprising MCRs selecting the well known end-node for a particular inter-cluster multicast group by invoking algorithmic mapping of multicast addresses and corresponding well known end-nodes.

40. The method, as claimed in claim 38, further comprising:
- an ATM host, wishing to transmit a multicast packet to members of a multicast group, sending said packet to a Multicast Server (MCS) entity;
- on receipt of said multicast packet, said MCS:
  - copying the multicast packet to all its interfaces where there are group members within the cluster, including the MCR (since MCRs behave promiscuously); and
  - unicasting said multicast packet to the corresponding well known end-node via a preestablished data channel; and
- if said multicast group is reported to said corresponding well-known end-node, said corresponding well known end-node:
  - extracting the multicast packet from the unicast packet; and
  - sending the extracted multicast packet to group members using its point-multipoint tree to said group members.

41. The method, as claimed in claim 40, further comprising a MCS wishing to participate in the multicast group, configuring an ATM address of a primary well known end-node and an ATM address of a secondary well known end-node.

42. The method, as claimed in claim 41, further comprising a MCR maintaining:
- a single bi-directional-control connection to the well-known end-node for registration/de-registration purposes;
- a single data unidirectional data channel for tunneling multicast packets; and
- a number (N) of incoming multicast VCs, where N is a total number of multicast groups.

43. The method, as claimed in claim 40, further comprising:
- in the event of failure of the primary well known end-node, dismantling all point-to-point connections between the MCS and said primary well-known end-node;
- each MCR, on detecting dismantlement of said connections, opening a new circuit to the secondary, well known end-node;
- each MCR registering ATM addresses of group members of which it is aware to the secondary well known end-node;
- said secondary well known end-node, on receipt of the ATM addresses, establishing point-multipoint trees for each group;
- said MCRs continuously trying to reestablish a connection with said primary well known end-node; and
- on reestablishment of said connection, said MCRs dismantling their connection to said secondary well known end-node and re-establishing their connection to said primary well known end-node.

44. A telecommunication system, including an ATM transmission system, adapted for the simultaneous transmission of IP data packets to a plurality of system users, using ATM as a carrier network, said transmission system includes:
- an IP/ATM network including clusters of Logical IP Systems (LISs);
- a multicast address resolution server (MARS) for each cluster; and
- a multicast router (MCR) for each cluster, in that said clusters are interconnected through said MCRs which form an inter-cluster backbone for said IP/ATM network, in that multicasting of IP data packets within a cluster utilizes a MARS protocol, and in that multicasting between clusters utilizes an inter-cluster multicasting protocol (ILMP), wherein a MCR is adapted, in advance of multicasting, to select a well known end-node using a selection algorithm that returns a same well known end-node for an inter-cluster multicast group when executed by any of said MCRs and to establish a connection to the well known end-node, said well known end-node being adapted to provide a database for ATM addresses of members of the inter-cluster multicast group, and in that said well known end-node is adapted to establish a point-to-multipoint tree and to distributing multicast traffic sent by a member of said inter-cluster multicast group to other members of said group using said tree.

* * * * *